Oct. 24, 1967 G. R. WATSON ET AL 3,348,915
METHOD FOR PRODUCING A CRYSTALLINE CARBIDE, BORIDE OR SILICIDE
Filed Nov. 7, 1961 7 Sheets-Sheet 1
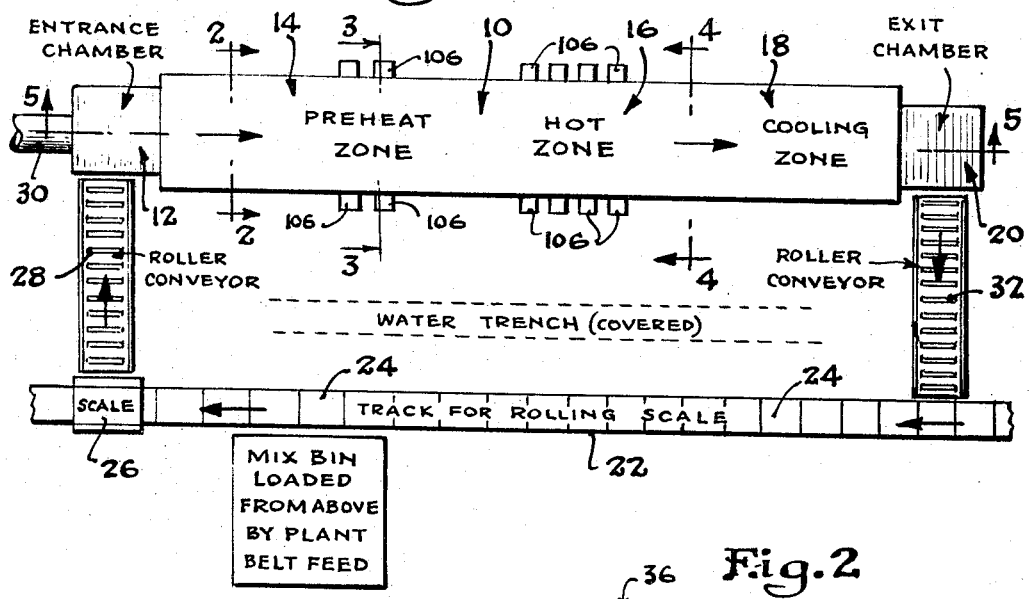
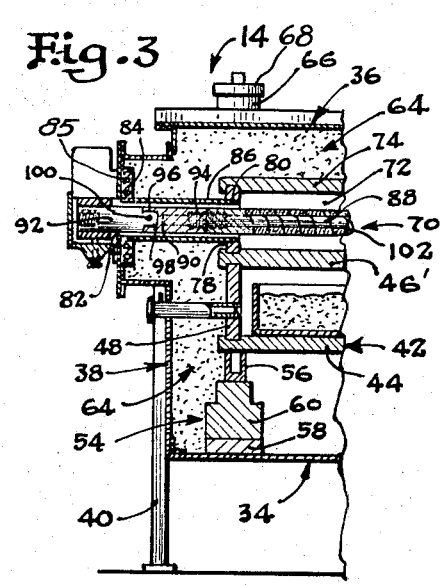
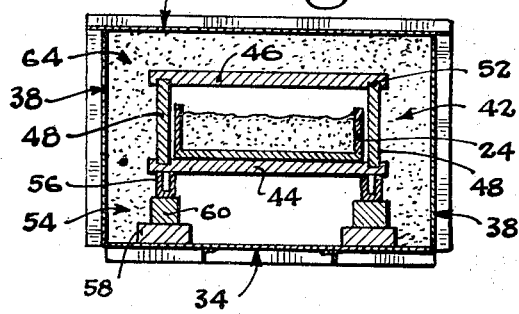
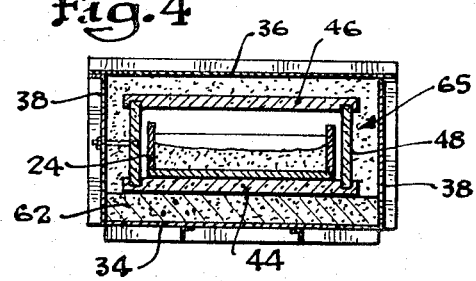
Inventors
George R. Watson
Ben Matchen
By Allan R. Redrow
Attorney

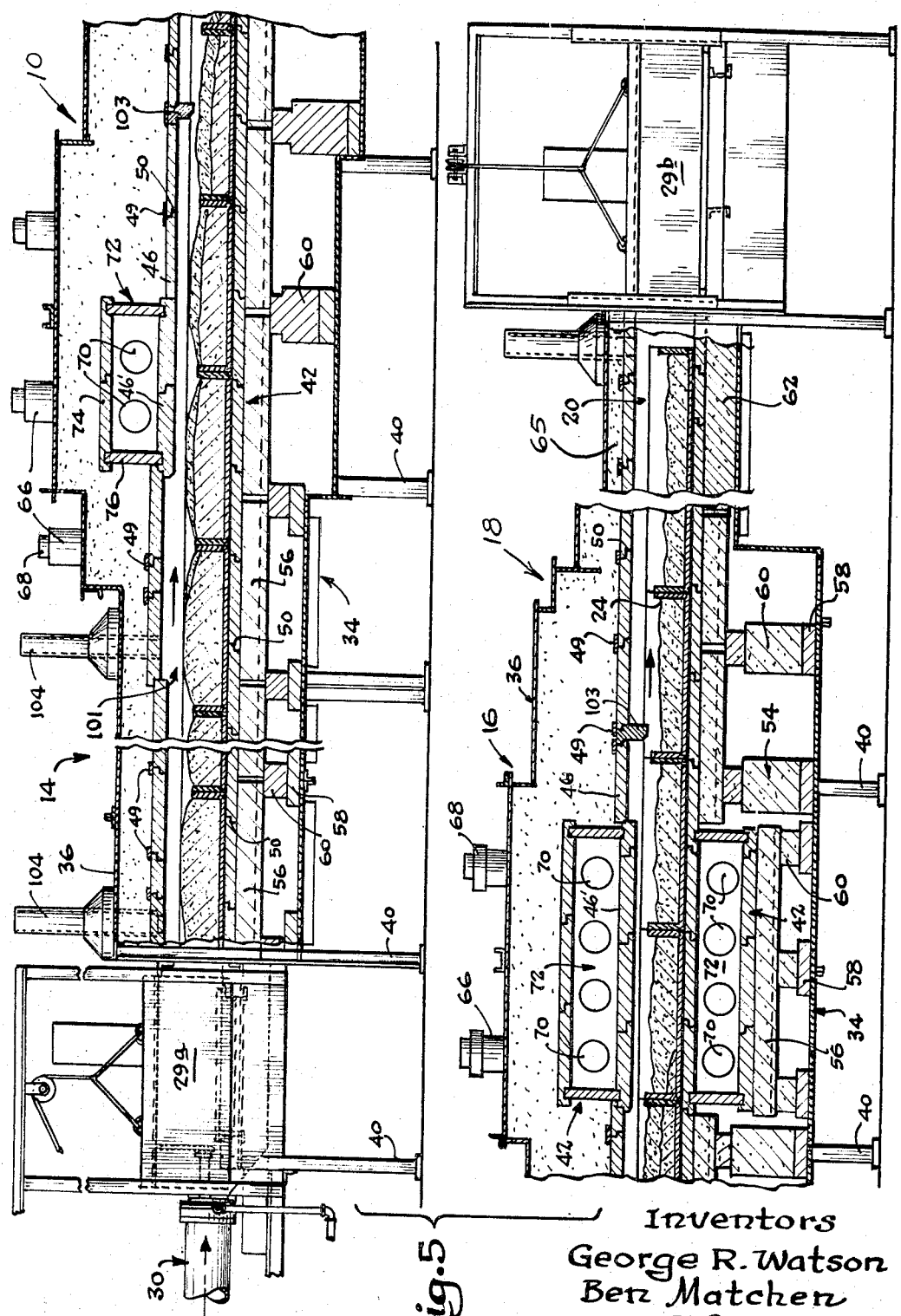

Oct. 24, 1967  G. R. WATSON ET AL  3,348,915
METHOD FOR PRODUCING A CRYSTALLINE CARBIDE, BORIDE OR SILICIDE
Filed Nov. 7, 1961  7 Sheets-Sheet 3

Inventors
George R. Watson
Ben Matchen
By Allan R. Redrow
    Attorney

Inventors
George R. Watson
Ben Matchen
By Allan R. Redrow
Attorney

Oct. 24, 1967 G. R. WATSON ET AL 3,348,915
METHOD FOR PRODUCING A CRYSTALLINE CARBIDE, BORIDE OR SILICIDE
Filed Nov. 7, 1961 7 Sheets-Sheet 5
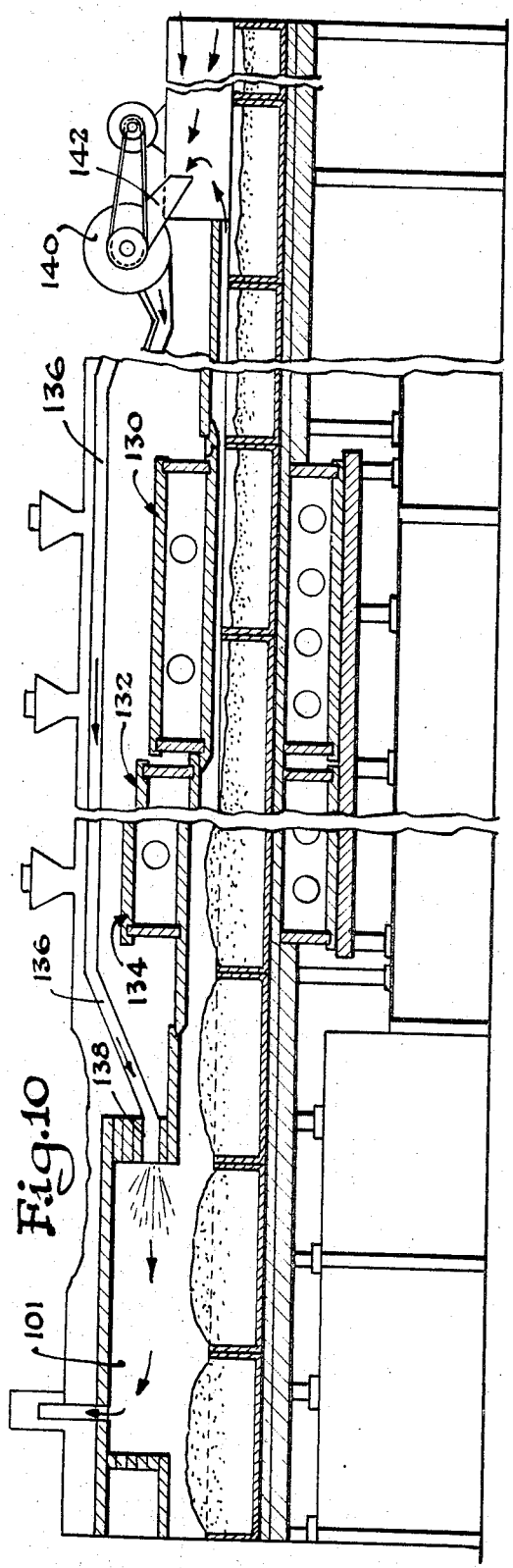
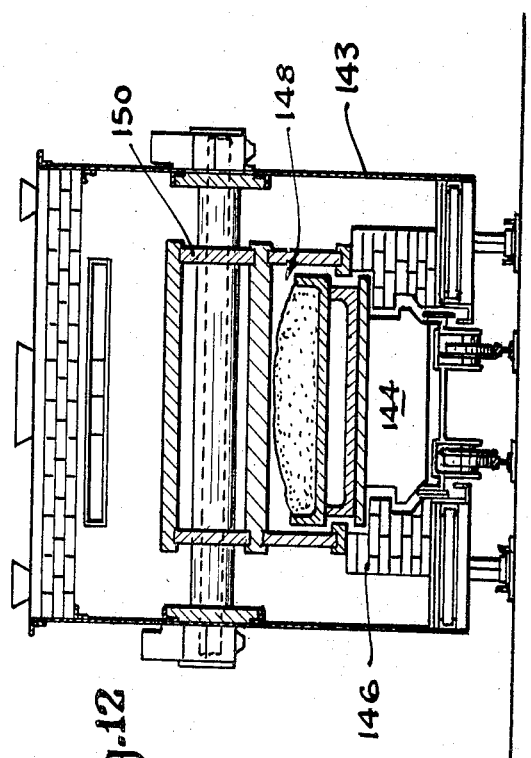
Inventors
George R. Watson
Ben Matchen
By Allan R. Redrow
Attorney

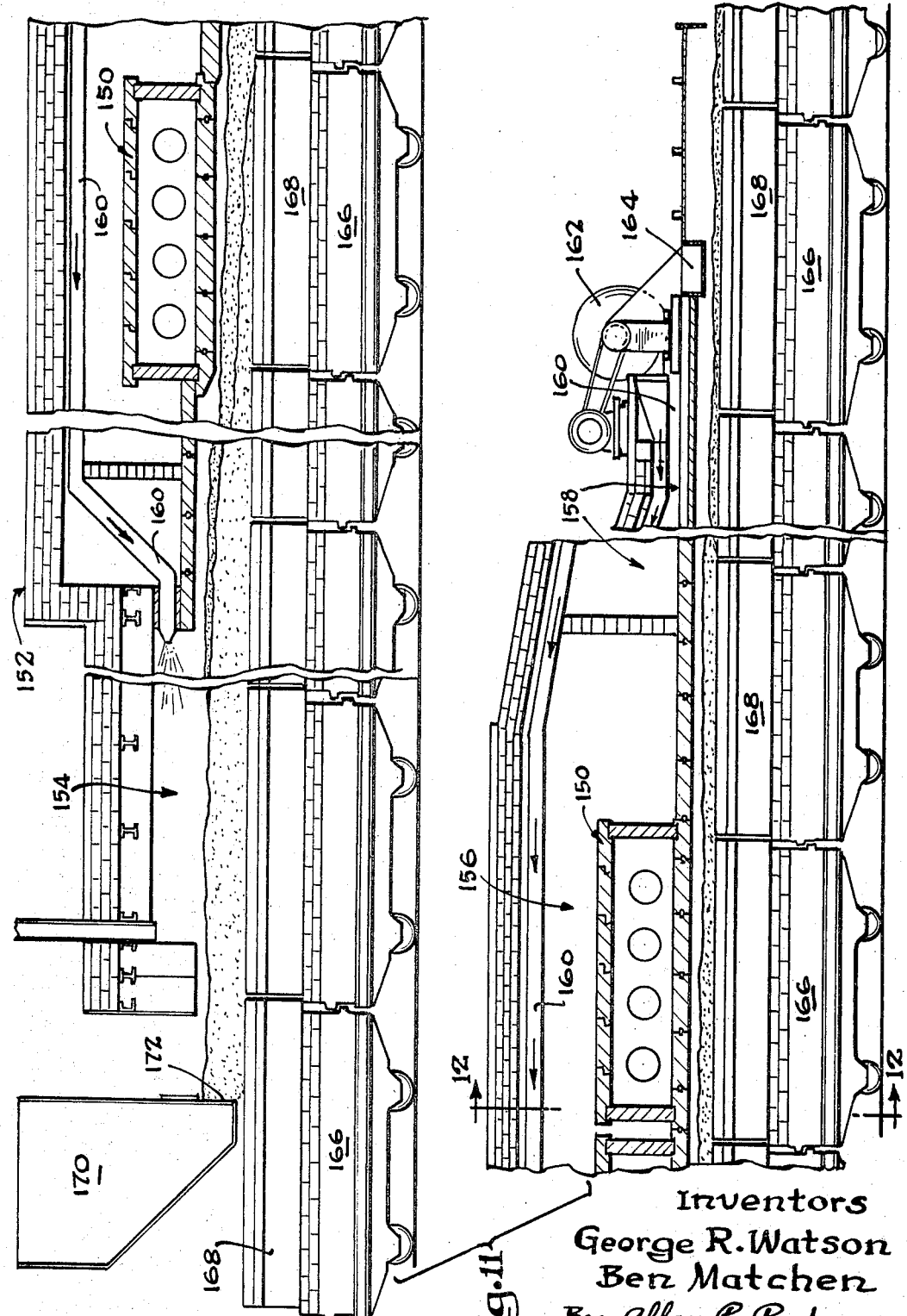

Oct. 24, 1967     G. R. WATSON ET AL     3,348,915
METHOD FOR PRODUCING A CRYSTALLINE CARBIDE, BORIDE OR SILICIDE
Filed Nov. 7, 1961     7 Sheets-Sheet 7
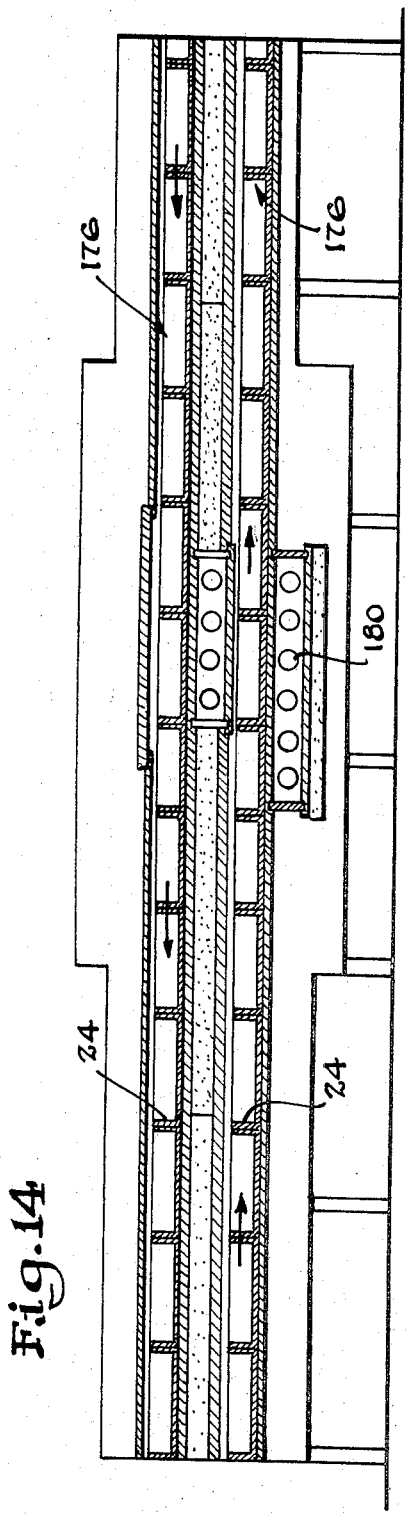
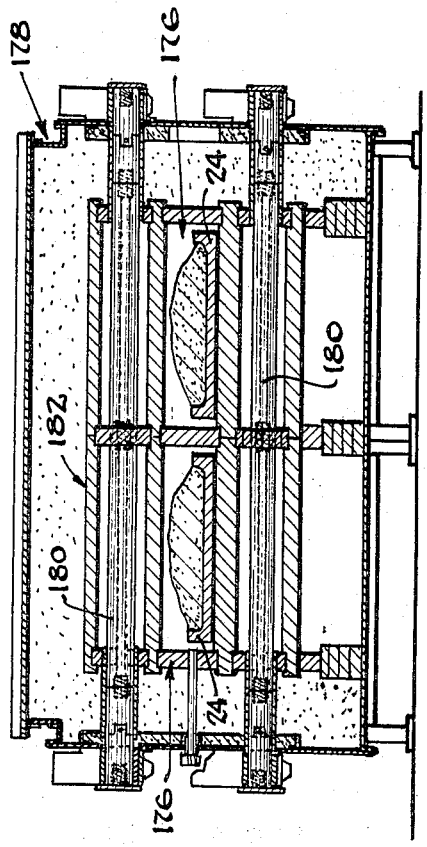
Inventors
George R. Watson
Ben Matchen
By Allan R. Redrow
Attorney

United States Patent Office 3,348,915
Patented Oct. 24, 1967

3,348,915
METHOD FOR PRODUCING A CRYSTALLINE CARBIDE, BORIDE OR SILICIDE
George Robert Watson, Chippawa, Ontario, and Ben Matchen, Niagara Falls, Ontario, Canada, assignors to Norton Company, Worcester, Mass., a corporation of Massachusetts
Filed Nov. 7, 1961, Ser. No. 152,125
3 Claims. (Cl. 23—204)

This invention relates to tunnel kilns and has for its general objects to provide a kiln particularly adapted for the synthesis of refractory and abrasive materials, such as metal carbides and/or borides; to provide an electrically heated kiln which will operate for long periods of time at temperatures up to about 2600° C. or higher; to provide a kiln for converting raw material in such a manner that there is no unconverted residue and so that a high-grade product emerges from the kiln continuously; to provide a kiln in which low-grade or partially converted materials may be converted into a useful product; to provide a kiln in which the temperature and rate of travel may be regulated to control the reaction so that the product can be sintered, fused or of intermediate texture; and to provide a kiln in which the conversion may be completed to such an extent that little or no sorting of the end product is required, that impurities are substantially eliminated and that re-cycling is not necessary.

Further objects are to provide a kiln which can be used to produce more than one product during the same operation; which can be used to make products from mixtures or shaped articles; to provide a kiln in which synthesis or reaction may be effected in the matter of a few hours instead of days; and in which synthesis or reaction may be effected at a significantly lower cost than heretofore possible. A further object is to provide a kiln in which the crystal growth of crystallizable material may be enhanced.

In more specific aspects, an object of the invention is to provide heating means designed to employ an amperage and voltage flow sufficient to attain sustained high temperature and to provide means for protecting the heating means from the harmful effects of chemicals present during the reaction. Another object is to provide improved clamping means for connecting the ends of the heating means to a source of power and for supporting them so that they can be removed for replacement without having to discontinue operation of the kiln. Another object is to provide for cooling the clamping means and for insulating the heating means from the other parts of the kiln. Other objects are to provide heating means which will not be injuriously affected by expansion, misalignment, and is efficient in operation. Another object is to provide a tunnel having preheating, hot and cooling zones through which the material may be conveyed. Another object is to provide means for preventing excessive losses of heat by radiation from the hot zone and to provide means for making use of the gases and vapors produced by reaction within the hot zone to supplement heating in the preheating zone. Another object is to provide means for supporting the tunnel by means which will not be adversely affected by the high heat and yet will be strong enough to withstand the weight of the tunnel and the material being moved therethrough; and to provide a filling between the tunnel and the surrounding shell of a kind which will minimize heat loss throughout the preheating and hot zones and a filling coextensive with the cooling zone which will promote dissipation of the heat.

As herein illustrated, the kiln has an outer shell within which there is supported a continuous closed tunnel which is divided into a preheating zone, a hot zone and a cooling zone. Heating is effected by radiation, by means of heating elements in the form of resistors disposed transversely of the tunnel at suitable intervals above and/or below the tunnel. There are muffles separating the resistors from the tunnel and from the interior of the shell surrounding the tunnel so that the elements will not be adversely affected by the evolved gases or the atmosphere. The muffles have portions which extend through the side walls of the shell and provide transverse chambers within the shell within which the resistors are supported at their ends by clamps mounted on the shell exteriorly thereof. The clamps provide means for connecting the resistors to a source of power and form with the muffles gas-tight chambers from which the resistors may be readily removed, by endwise movement after unclamping the ends, for ease of replacement without shutting down the kiln. The portions of the resistors coextensive with the width of the tunnel are hollow and are spiral construction to provide for axial expansion, flexibility and greater resistance in contrast to the end portions which are solid and, because of their lesser resistance to conductance, relatively cool. Preferably the end portions are detachably connected to the intermediate portion to permit removal of the intermediate portion when burned out without replacement of the end portions. The tunnel is comprised of slabs of graphite arranged to provide a chamber of substantially rectangular cross-section and is supported on graphite channels lengthwise of the shell, the latter, in turn, being supported at suitable intervals by means which are designed to withstand high heat and are strong enough to withstand the weight of the tunnel and the material being moved through the tunnel. Throughout that portion of the kiln coextensive with the preheating and hot zones, the space between the tunnel and shell is filled with powdered carbon black so as to minimize heat loss. The portion of the kiln coextensive with the cooling zone is filled with powdered silicon carbide so as to dissipate heat. Preferably the interior of the tunnel has, at the ends of the heating ozne, downwardly projecting shields which retard loss of heat therefrom by radiation. In one form of the invention, the roof of the tunnel diverges upwardly from the hot zone toward the preheating zone and the latter has at the top a combustion chamber into which gases evolved in the hot zone flow and, by ignition therein, supplement heating of the preheating zone. Combustion is augmented by supplying heated air from the cooling zone to the combustion chamber. Graphite trays are moved, one after another, along the tunnel by a ram disposed at the entrance end of the kiln which pushes each tray its own length into the tunnel. Optionally, the bottom of the tunnel may be constituted by a plurality of cars movable through the shell, adapted to support trays of material to be treated. The resistor clamps are in the form of stirrups open at opposite sides and fastened to the wall of the shell over the openings through which the resistors extend so that the protruding ends of the resistors are situated therein. Adjustable clamping elements within the stirrups provide for clamping the resistors and connecting them to a source of power. The outer sides of the stirrups are closed by covers which provide a gas-tight seal. Preferably the stirrups and the walls of the shell adjacent the stirrups are water-cooled.

The invention will now be described in greater detail with reference to the accompanying drawings wherein:

FIG. 1 is a plan view showing diagrammatically a kiln having entrance and exit chambers, conveyors for supplying material to be treated to the entrance chamber and for removing the final product from the exit chamber, and a feed belt for moving material to a scale for weighing prior to delivering it to the conveyor at the entrance end of the kiln;

FIG. 2 is a vertical section taken on the line 2—2 of FIG. 1;

FIG. 3 is a fragmentary vertical section taken on the line 3—3 of FIG. 1;

FIG. 4 is a vertical section taken on the line 4—4 of FIG. 1;

FIG. 5 is a vertical section taken lengthwise of the kiln;

FIG. 10 is a vertical section taken longitudinally of an alternative form of kiln in which the heating elements in the hot zone are arranged in stepped relation;

FIG. 11 is a vertical section taken longitudinally of an alternative form of kiln in which cars are used for moving the material through it;

FIG. 12 is a vertical section taken transversely at line 12—12 of the kiln shown in FIG. 11;

FIG. 13 is a vertical section of an alternative form of counterflow kiln; and

FIG. 14 is a vertical section of an alternative form of counterflow kiln with two levels of flow.

Figure 6:
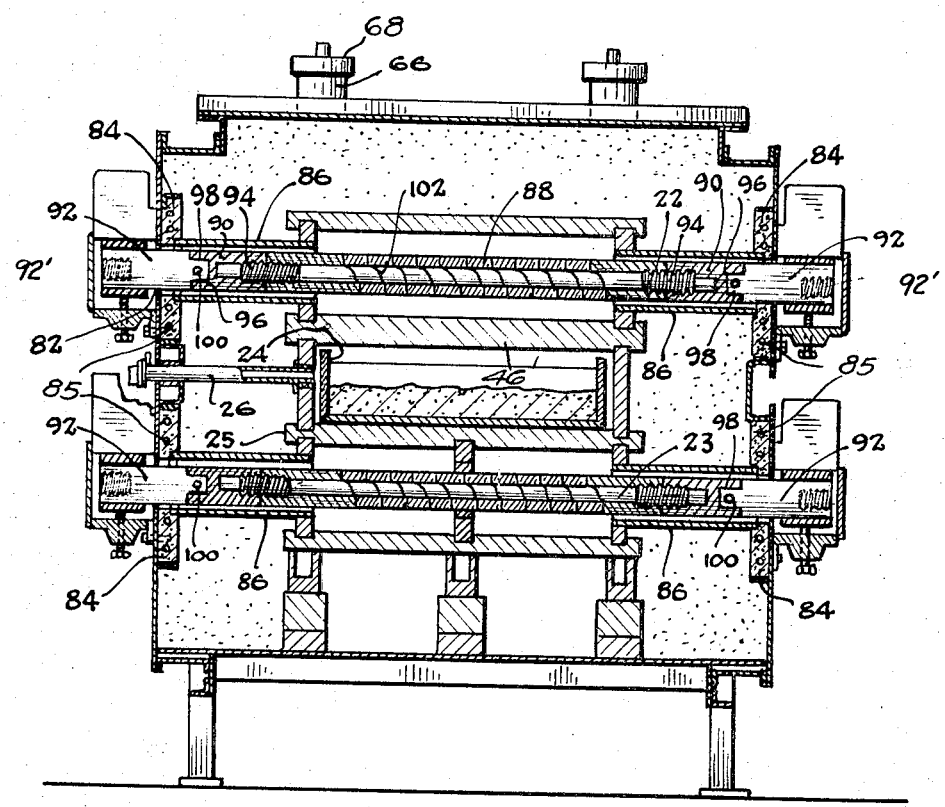
FIG. 6 is a vertical section on line 6—6 of FIG. 1, to much larger scale, showing the hot zone of the kiln provided with heating means above and below the tunnel.

The conventional commercial process for manufacturing silicon carbide uses a resistor of coke or graphite granules embedded in a mixture of sand and coke. Some manufacturers use a preformed graphite or carbon resistor in place of the granular type core. In any event, only the central portion of the mixture is converted into silicon carbide and a very large percentage of the mixture has to be re-cycled in subsequent runs. The kiln, shown herein, is designed to make silicon carbide with no reclaims, so that a sand-coke mixture entering one end of the furnace emerges from the other end as silicon carbide, thereby eliminating rehandling and constituting an obvious advance over the prior practice.

While silicon carbide is used for the purpose of illustrating the advantageous features of the kiln, which forms the subject matter of this invention, it is to be understood that it is useful for synthesizing other material such as zirconium carbide, titanium carbide, tungsten carbide, boron carbide, zirconium boride, titanium boride, calcium boride, molybdenum carbide and boride, molybdenum silicide, chromium silicide and many others, by varying the operating conditions in certain respects, for example temperatures, times, and the like. The products produced by the use of the kiln can be made finely crystalline in the form of powders requiring little or no milling before use, or in fused form if desired. This versatility is of great importance, for example carbides for powder metallurgy can be made in a very fine state of subdivision so that expensive milling operations and the possibility of contamination from milling media are eliminated.

Referring to the drawings (FIG. 1), there is shown a horizontal tunnel-type kiln 10 which has an entrance chamber 12, a preheating zone 14, a hot zone 16, a cooling zone 18 and an exit or discharge chamber 20. Paralleling the kiln is a conveyor 22 for moving a series of graphite trays 24 into a position to be filled with a raw mixture and then onto a scale 26 for weighing. The graphite trays are moved from the scale 26 by a conveyor 28 into the entrance chamber 12 of the kiln, through a guillotine-type door 29a, see FIG. 5, which is thereupon closed to keep out the air as much as possible. A hydraulic ram 30 is then advanced to push the tray forward a distance at least equal to its own length into the furnace. Once the tray has advanced its own length the ram is brought back to its initial position and another tray may be moved by door 29a and inserted in the same manner while simultaneously a tray containing the end product is removed from the exit chamber 20 through a similar guillotine-type door 29b onto a conveyor 32. The trays are moved through the furnace at a predetermined rate so that the batches in the trays are gradually heated as they near the hot zone, subsequently converted to the products desired during passage through the hot zone, and finally cooled to near room temperature while passing step by step through the cooling zone.

The kiln, FIG. 3, has an outer shell of sheet metal, substantially rectangular in vertical cross-section, comprised of a bottom wall 34, a top wall 36 and side walls 38 welded or otherwise suitably secured together. The shell is supported above the floor by pairs of legs 40 welded to its side walls 38 at regular intervals throughout its length. A tunnel 42 is mounted within the shell in spaced parallel relation to the walls of the shell and has a bottom wall 44, a top wall 46 and side walls 48. The bottom, top and side walls are made up of rigid slabs of graphite, about 2 inches thick. The adjacent edges and surfaces of the slabs are rabbeted where they have contact, as shown in section in FIGS. 2, 4, and 5, and sufficient space is left between the slabs to allow for expansion at the high temperatures employed. For a purpose that will appear more fully below, each joint between the slabs 46 forming the top wall is covered with a thin strip 49 of graphite, the inside of which has been coated with a graphite paste. The slabs in the bottom and top walls have lap joints 50 whereas the joints between the side walls and the top and bottom walls 52 are groove and tenon. The tunnel has a cross-section which is wider than the graphite trays which are to be moved therethrough and of sufficient height so that the material placed in the trays will have room for some expansion without touching the top. At the entrance and exit ends the tunnel is lined with fire brick to resist oxidation.

Throughout the greater part of the length of the shell, to wit, the preheating and hot zones, the tunnel is supported on piers 54. The piers are made up of beams or graphite channels 56 of a U-shaped cross-section, which are disposed to extend lengthwise of the tunnel from end-to-end, the beams being so positioned that the legs or edges of the channel walls have contact with the bottom wall 44 of the tunnel. At regularly spaced intervals there are supporting blocks 58 comprised of zirconia which form footings for the piers and carbon blocks 60 interposed between the footings and graphite channels. The zirconia blocks provide the necessary strength and rigidity to withstand the weight of the tunnel, the carbon blocks strength and insulation and the graphite channels primarily lengthwise rigidity and strength. The graphite channels terminate at the end of the hot zone. Insulation is provided throughout the preheating and hot zones by filling the space between the top, bottom and side walls of the tunnel and the shell with carbon black 64 which is poured into the shell about the tunnel through stacks 66, normally closed by means of covers 68. Since the carbon black tends to settle during use of the kiln the void may be filled from time to time, by adding additional carbon black through the stack 66. The thin strips 49 which cover the joints between the slabs forming the top, prevent the carbon black from working through the joints and into the kiln.

The cooling zone is supported by a rigid graphite slab 62 which rests on the bottom of the shell, the purpose of which is to conduct heat away from the cooling zone in contrast to the structure at the preheating and hot zones where the primary consideration is to retain the heat as long as possible. At the cooling zone the insulation is omitted from the bottom, top and sides of the tunnel and granular silicon carbide 65, FIG. 4, may be substituted for the carbon black as a filling so as to carry away the heat at a controlled rate. Also if desired a water cooling spray may be directed against the underside of the steel shell which supports slab 62 to increase the cooling effect.

The vertical cross-section of the outer shell varies from zone-to-zone, the largest cross-section being situated at the hot zone 16 as shown in the lower left hand corner of FIG. 5 where the largest amount of insulation is desired to retain the heat. The cross-sections at the preheating and cooling zones are smaller in area and a smaller amount of insulation suffices for maintaining the desired condition in the preheating zone and the cooling zone is constructed as described above. The shell is shown as being stepped from one section to another; however, a uniformly changing section may be employed as shown in FIG. 10, if desired.

The preheating zone 14, as shown in FIGS. 3 and 5, has one or more heating elements 70 which are disposed transversely of the tunnel in a muffle chamber 72. The bottom wall of the muffle chamber forms the top wall of the tunnel and the muffle chamber has a top wall 74, side walls 76 and end walls 78. In order to provide satisfactory kiln life, the bottom wall 46' of the muffle is preferably made somewhat thicker than the ceiling 46 in the rest of the tunnel and is of the order of 2½ to 3 inches thick. The end walls 78 contain openings 80. Opposite the openings 80 in the end walls 78 there are openings 82 through the side walls 38 of the outer shell and through refractory linings 84 at the inner sides of these walls which will be described hereinafter. Muffle tubes 86 are disposed between the openings 80 and 82, the tubes being comprised of graphite and being sealed at their ends so that the interior of the muffle chamber is sealed from the space between it and the shell. The heating elements or resistors are disposed in the muffles with their ends projecting therefrom through the muffle tubes 86 and through the walls of the shell to the exterior for connection to a source of power by specially constructed gas-tight clamps which will be described hereinafter.

The heating elements 70 are preferably graphite electrical resistors comprised of a center section 88 which is a spirally cut tubular element and end sections 90 and 92 of solid cross-section. The adjacent ends of the hollow section 88 and each of the solid sections 90 have axial openings which are threaded and are detachably connected by threaded plugs 94. The outer end of each end section 90 contains an axially disposed hole 96 and the inner end of each of the end sections 92 contains a corresponding male element 98 which fits into the hole. The sections 90 and 92 are removable but held firmly connected by a pin 100. The section 92 has an internally threaded end 92' and when the center section 88 burns out a threaded puller may be engaged in end 92' to pull out the broken element. Hence this construction provides for an easy and economical way of replacing the broken elements. Furthermore, in accordance with the invention, the center section is so constructed as to be the primary source of heat, the end sections remaining substantially cold.

The spiral grooving of the center section of the resistor provides certain advantages in that first, it permits the center portion of the resistor to expand axially intermediate the clamped ends and, second, it permits yielding and hence a certain amount of misalignment of the clamps. As is well known, the spiral is cut at a pitch consistent with the resistivity of the graphite to produce the desired resistance to form the electrical resistance element.

The hot zone 16, as herein shown in FIGS. 5 and 6, has four electrodes 70 enclosed within a muffle 72; however, the number can be varied depending upon the length of the zone to be kept hot, the temperature to be maintained and the character of the reaction being performed. A corresponding number of resistors 70 and a muffle 72 may be provided at the underside of the tunnel to increase the heat input. The bottom 46' of the upper muffle chamber at the reaction or hot zone is somewhat thicker than the ceiling 46 and is preferably 2½" to 3" in thickness.

The hot zone with heating muffles above and below provides a convenient construction by means of which it is possible to balance or adjust the heat input to the reaction to suit any desired conditions. For example in a SiC production process the SiC reactants tend to vaporize and corrode the graphite 46' in the hot zone; by putting more heat in through the bottom of the tray carrying the reacting mixture, the vaporizaton can be brought under control. In another instance, however, in making TiB₂, for example, it is desirable to have an even temperature gradient throughout the reacting mass and since the tray has a sliding contact with the bottom muffle and is spaced somewhat from the upper muffle, more heat must be delivered to the hot zone through the upper muffle to produce the desired effect. The ability to balance the input of energy from the bottom and top muffles is one of the important features of this invention.

To maintain a uniform temperature of up to and in excess of 2600° C. in the hot zone, the insulation above described is used. It is also necessary to prevent loss of heat from the hot zone along the tunnel by radiation and, to this end, radiator shields 103 (FIG. 5) are placed at the opposite ends of the hot zone transversely of the tunnel. The lower edges of the shields are just high enough to permit the upper edges of the trays 24 to pass beneath them without touching.

The preheating zone 14 has at its entrance end a chamber 101 into which the hot gases evolved in the hot zone are caused to flow. The chamber is formed by making the roof of the tunnel somewhat higher at the preheating zone. Exhaust stacks 104 are connected thereto. This chamber increases the kiln capacity without overloading the heating elements by extracting heat from the gases evolved in the hot zone which, in the performance of some reactions may be mixed with air and fired in the chamber 101 and burned therein to supply extra heat. Typical of such reactions are the following:

Metal oxide+carbon→metal carbide+CO

Metal oxide+carbon+boric acid→metal boride+CO

Metal oxide+metal carbide+boron carbide→metal boride+CO

Metal oxide+silicon carbide+carbon→ metal silicide+CO

The products of combustion and/or spent gases are discharged through the stacks 104 at the top of the chamber.

Titanium diboride, for example, has been successfully produced in the tunnel kiln of this invention by the following reaction:

TiC+CB₄+TiO₂→2TiB₂+2CO

Similarly by the use of a mix of zirconium carbide and zirconium oxide with boron carbide, zirconium diboride was successfully produced.

The walls forming cooling zone 18 are provided with refractory materials having a relatively higher thermal conductivity characteristic as related above.

Optionally, as shown in FIG. 10, the hot zone may have several heating units 130, 132 and 134 comprising muffle chambers containing resistors, disposed above the top of the tunnel in stepped relation, the purpose of which is progressively to decrease the height of the space above the trays, that is, between the heating units and the trays as they move through the zone. This accomplishes increasing more intense heating of the reacting material and a better flow of the gases evolved from the material in the hot zone into the chamber 101. An air conduit 136 is supported in the shell above the tunnel with one end 138 entering the combustion chamber and the other end connected to the discharge side of a blower or pump 140 situated at the exit end of the kiln. The pump has its intake side 142 connected to the interior of the cooling zone. Thus, air in the cooling zone heated by contact with the product moving therethrough for discharge and some of the evolved gases from the hot zone which may flow toward the discharge end are sucked up by the blower 140 and delivered through the conduit 136 to its discharge end 138 disposed to feed these gases into the chamber 101 where they mix with other gases from the hot zone and may form a combustible mixture which may be burned therein to supply supplemental heat for the preheating zone. The products of combustion in this instance are discharged through stacks at the top of the chamber. As shown in FIG. 10, the heating units at the underside of the tunnel are disposed at a uniform level.

FIGS. 11 and 12 show an adaptation of the described construction to a car-type kiln, designed especially for producing carbides and borides. The shell 143 of the kiln has an opening at its bottom, from one end to the other, of sufficient size to permit movement of flat cars 144 therethrough. Brick-work walls 146 are at opposite sides of the opening and extend along each side of this form of the kiln to support the tunnel 148 and at intervals lengthwise of the tunnel muffle chambers 150 are disposed for enclosing the heating elements. There is a preheating zone 152 including a chamber 154 generally corresponding to chamber 101 above described, a hot zone 156 and a cooling zone 158. A conduit 160 is disposed at the top of the kiln above the tunnel with one end entering the chamber 154 and its other end connected to the discharge side of a blower 162 situated at the exit end of the kiln, the blower having an intake 164 in communication with the interior of the cooling zone. Thus air heated by contact with the cooling product and some of the evolved gases from the hot zone are supplied to the chamber 154 for mixing with more of the products of the reaction where the mixture may burn and provides heat for supplementing that of the resistors. The bodies 166 of the flat cars are of conventional design and support the trays 168 for movement through the tunnel. As a car enters the tunnel the tray 168 supported thereby, is filled from a hopper 170 and the top is smoothed down by a scraper on hopper 172 so as to pass through the tunnel without contact with the top.

FIG. 13 shows a further modification of the kiln wherein there are two tunnels 176 arranged within the shell 178, in one of which the material being processed is moved in one direction and, in the other of which the material is moved in the opposite direction. The tunnels are constructed and supported in the shell as described above. The incoming trays 24 in one line are preheated by the outgoing trays of the other line with an advantage of effiicent use of heat. In this particular kiln, heating elements 180 are preferably mounted above and below the tunnel in muffles 182 at the heating zone. The preheat zones of course are individually heated as above described and the cooling zones have a common wall with the opposite disposed preheat zone for the purpose of heat exchange.

FIG. 14 shows a counterflow kiln wherein there are two lines of material on different planes.

Suitable pyrometer, thermocouple, or other temperature control means may be associated with the various zones of the kiln. The preheat and hot zones may thus be manually or automatically controlled to a very exact degree by varying the heat input to the electrical resistors to produce the optimum temperature conditions in the several zones to best promote any particular reaction.

Figure 7:
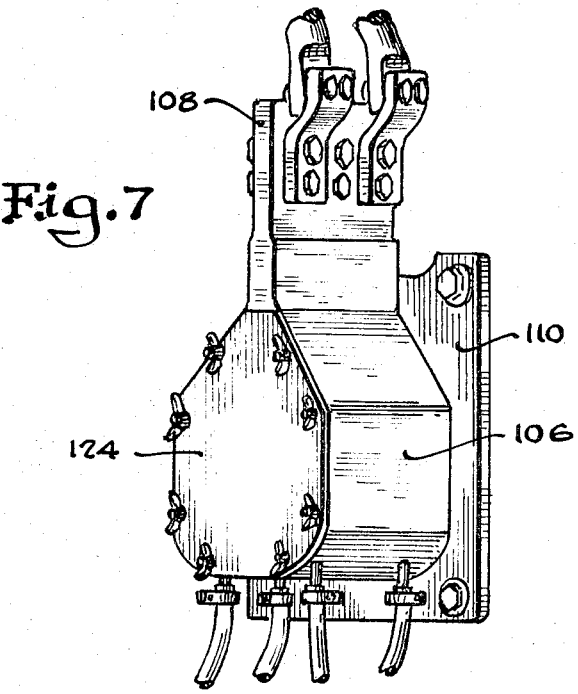
FIG. 7 is a perspective of a resistor clamp and terminal.
Figure 8:
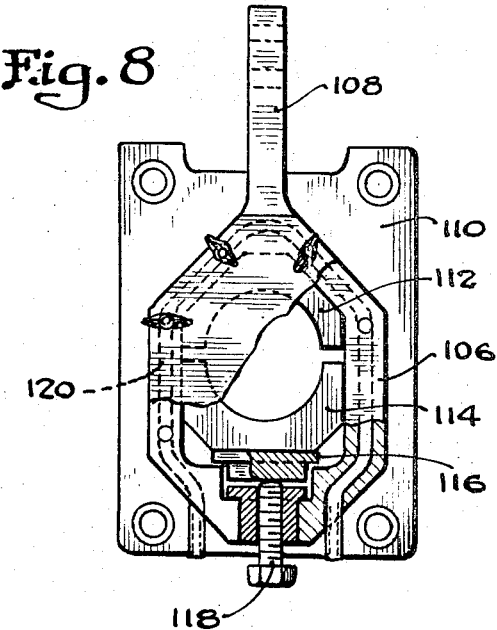
FIG. 8 is a front elevation of the clamp with the cover removed.
Figure 9:
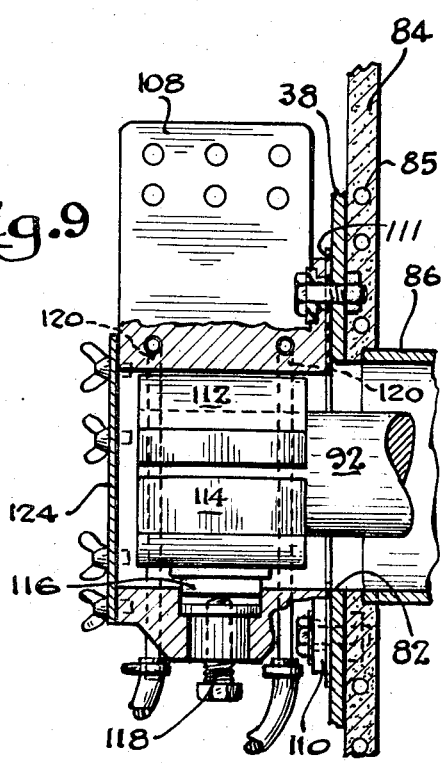
FIG. 9 is a side elevation partly in section.

The clamps for connecting the electric current to the heating elements are shown in FIGS. 7 to 9 inclusive. Each clamp has a hollow stirrup portion 106, to the upper part of which is integrally attached a bus bar 108 to which conductors from a suitable source of power may be fastened. As shown in FIG. 9, one side of the stirrup body 106 has a flange 110 by means of which the stirrup may be bolted to the wall 38 of the kiln over the openings 80 and 82 through which the resistor projects. A suitable electrical insulating gasket 111 is positioned between wall 38 and flange 110 and the bolts are also insulated from wall 38 as by suitable insulating sleeves. A pair of clamp or resistor bar engaging elements 112 and 114 (FIG. 8) are disposed in the hollow stirrup portion in the body 106, the part 112 being lodged within the upper part of the opening and the part 114 resting on a gib 116 at the lower part of the opening and being movable toward the part 112. The parts 114 and 116 contain recesses which collectively correspond in cross-section to the cross-section of the resistors and by moving the part 114 toward the part 112 they may be caused to surround and grip the end of the resistor. To effect such clamping movement a screw 118 is threaded through the bottom of the body 106 so that its lower end engages the gib 116. By rotating the screw the gib may be moved upwardly so as to press the part 114 against the lower side of the resistor and, in turn, to press it into engagement with the clamp part 112. The parts 112 and 114 may be made of graphite or of copper and while their inner surfaces are shown as cylindrical they may be of a different shape depending upon the cross-section of the resistor itself. The clamps are of sufficient axial length to provide for a large area of contact between them and the resistor and in order to insure the maximum amount of conformity the clamp parts may be grooved lengthwise to allow for a certain amount of flexibility, so that when they are pressed into engagement with the resistors they will make intimate contact therewith. The body of the stirrup portion of body 106 has cast in it a tubular passage 120 which extends from the bottom on one side around the opening to the bottom on the other side for conducting a cooling fluid through the body. Preferably the tube may be made of Inconel metal and formed in place when the body 106 is produced. A cover plate 124 is designed to be bolted to the front side of the stirrup and may be fitted with a suitable valved gas connection fitting which may be used for purging the muffle chamber of unwanted gases from end to end before the resistor is connected to a power source. The purging operation may be repeated at intervals during use of the kiln to blow away various oxides that might condense out on the interior surfaces of the muffle and cause electrical losses. The resistor is thus completely sealed within its muffle, tube and clamp and is protected from the oxidizing effect of the air and/or the evolved gases from the reaction, is kept cool at its ends and can be easily removed for replacement of a center section whenever the latter becomes burned out.

The walls of the shell adjacent the hot zone and electrical resistor connection openings are lined with refractory slabs 84, as previously mentioned, which may preferably be formed of fused alumina mixed with calcium aluminate and containing copper tubing 85 which is formed integral with the slabs during casting thereof for circulating water for cooling. Such a plate is electrically non-conducting and the cooling effected in this manner prevents overheating and melting of the refractory slabs at the location of the resistors, protects the steel walls from overheating and precludes undue heat transmission from the hot zone insulation to the outside, thus materially improving the life of the kiln and electrical connector clamps.

The kiln described herein is particularly adapted for continuous operation under relatively high temperature conditions. The preheating arrangement coupled with the hot zone and cooling zones here described making it possible to feed material continuously into a hot zone to complete high temperature reactions without incurring undue deterioration of the tunnel structure and its supporting outer shell.

We have continuously operated this kiln for long periods of time at temperatures within the range of readings on an optical pyrometer of upwards of 1500° C. and as high as 2450° C. and above, by sighting the pyrometer on an intermediate phase of the graphite side wall of the tunnel. Due to the radiation of heat from the wall and also since the pyrometer opening in the wall of the kiln is spaced from the reaction zone, we believe temperatures as high as 2600° C. are produced in the center of the reacting mass in the hot zone. We find evidence of a temperature in this range by noting the presence of a graphitized surface on SiC when it is produced or passed through the zone.

We have formed abrasive silicon carbide by moving feed trays through the kiln at a constant rate of approximately 2¼″/hour by subjecting a mixture of silica and carbon to a temperature in the preheating zone sufficiently high to raise the temperature of the mixture in the trays from room temperature to about 1600° C. or higher and then completing the reaction by raising the temperature of the mix to above 2400° C. in the hot zone. The kiln has a preheat zone approximately 15′ long, a hot zone approximately 8′ and a cooling zone approximately 12′ in length. These dimensions of course can be varied as desired. The reacted silicon carbide is then gradually cooled down upon leaving the hot zone to a temperature of approximately 100° C. before leaving the kiln. The passage of each succeeding tray from inlet to outlet of the kiln to produce the SiC provides a substantially continuous flow of the completely reacted SiC from the kiln. This reaction to produce SiC is aided, as above explained, by burning the carbon monoxide gas produced upon reacting the silica with carbon, the burning of the CO being utilized during the preheating operation.

The kiln has also been used for sintering silicon carbide particles to produce electrical heater bars. As is well known, such heating elements may be formed by self bonding or recrystallizing silicon carbide particles that have been compacted together. We have sintered such heating elements to complete their manufacture within a time period of six hours within a kiln of this construction. The recrystallization of silicon carbide bars may be accomplished following substantially the pattern of temperature changes used for production of silicon carbide. An ultimate temperature of approximately 2250° C. in the hot zone has been used to accomplish this type of manufacturing operation.

Characteristic titanium boride, cubic silicon carbide and molybdenum disilicide reactions have been performed with a feed rate of 7″/hour in such a kiln construction. The titanium diboride reaction may be completed at a temperature of approximately 2150° C. while cubic silicon carbide and molybdenum disilicide may be produced at temperatures within the range of 1850° C. to 1950° C. within the hot zone.

Chromium carbide has been produced in this kiln at a temperature in the hot zone within the range of 1550° C. to 1600° C. A feed rate of 8″/hour was needed to complete the preheating, the reaction and the cooling.

All of the above described reactions follow known procedures; however, the kiln disclosed herein provides an improved structure for accomplishing a preheating to condition each individual batch for the reaction. As described above, the hot gases flowing from the reacting masses upwardly through the already reacted surface mass promotes a better crystallization of the entire batch whereby improved results are accomplished. This kiln structure also provides a means for quickly converting from one production run to another and producing closely controlled quality of any desired product.

Kilns constructed as described above provide several other important advantages. For example, as described above, in synthesizing carbides, borides and silicides, carbon monoxide is given off in the hot zone. By conducting the carbon monoxide to the chamber at the entrance end of the preheating zone and mixing it with air, as described above, a combustible mixture is provided which burns and augments the heating of the preheating zone. This reduces the load on the resistors and provides economies in operating costs. Conductance of the monoxide gases toward the chamber is augmented in one form of the invention by the stepped arrangement of the resistors at the top of the tunnel, as heretofore pointed out, which increases the space between the product and the roof of the tunnel in the direction of the chamber in which combustion takes place. This has a further advantage in the process for making silicon carbide since the sand-coke starting mixture tends to shrink as the reaction proceeds and the stepping of the resistors maintains the source of heat at a substantially uniform distance from the surface of the mixture as it moves through the kiln.

Improved crystallinity of products may be obtained when processed in the aforesaid kiln due to the fact that as the mixture moves through the preheating zone, the top layer is reacted first and when the mass subsequently moves through the hot zone and the subjacent material is reacted, the evolved gases given off rise through the already converted top layer to distribute heat and thereby increasing the crystal growth.

Still another advantage resides in the fact that different batches of materials for the production of different borides, silicides, carbides, etc., may be treated at the same time without contamination of one by the other, by the simple expedient of interposing one or more empty trays between trays containing the different materials. It is obvious that trays or flat car loads of mixtures and other trays or cars loaded with partially shaped articles may be loaded in the trays and/or cars and moved through the kiln for processing and that by changing the rate of feed as effected by the ram or movement of the cars or the temperature within the kiln, or the quantity of heat input, the condition of the end product in any case may be closely controlled.

It should be understood that the present disclosure is for the purpose of illustration only and that this invention includes all modifications and equivalents falling within the scope of the appended claims.

We claim:
1. In a method for producing a crystalline metal boride from a mass of intimately mixed reactants comprising a metal oxide, a boron-containing compound and a solid carbon-containing material, said mass comprising a top portion and a portion subjacent thereto, the improvement comprising heating said mass in a first zone to a temperature sufficient to react said reactants in said top portion of the mass to produce said crystalline metal boride and to revolve gaseous carbon monoxide, continuing heating said mass in a second zone to a temperature sufficient to substantially complete the reaction of said reactants in said mass and to produce in said subjacent portion said crystalline metal boride and simultaneously evolving gaseous carbon monoxide which rises through said top portion of said mass to increase the crystal growth therein.

2. In a method for producing a crystalline metal silicide from a mass of intimately mixed reactants comprising a metal oxide, a silicon-containing compound and a solid carbon-containing material, said mass comprising a top portion and a portion subjacent thereto, the improvement comprising heating said mass in a first zone to a temperature sufficient to react said reactants in said top portion of the mass to produce said crystalline metal silicide and to evolve gaseous carbon monoxide, continuing heating said mass in a second zone to a temperature sufficient to substantially complete the reaction of said reactants in said mass and to produce in said subjacent portion said crystalline metal silicide and simultaneously evolving gaseous carbon monoxide which rises though said top portion of said mass to increase the crystal growth therein.

3. In a method for producing a crystalline carbide from a mass of intimately mixed reactants comprising (a) a member selected from the group consisting of silica and a metal oxide, and (b) a solid carbon-containing material, said mass comprising a top portion and a portion subjacent thereto, the improvement comprising heating said mass in a first zone to a temperature sufficient to react said reactants in said top portion of the mass to produce said crystalline carbide and to evolve gaseous carbon monoxide, continuing heating said mass in a second zone to a temperature sufficient to substantially complete the reaction of said reactants in said mass and to produce in said subjacent portion said crystalline carbide and simultaneously evolving gaseous carbon monoxide which rises through said top portion of said mass to increase the crystal growth therein.

(References on following page)

References Cited

UNITED STATES PATENTS

| | | | |
|---|---|---|---|
| 820,031 | 5/1906 | Willson | 23—208 |
| 949,386 | 2/1910 | Tone. | |
| 964,459 | 7/1910 | Strauss | 23—204 |
| 1,040,978 | 10/1912 | Cowles | 23—277 |
| 1,062,606 | 5/1913 | Ramen | 263—28 |
| 1,327,736 | 1/1920 | Reid | 23—208 |
| 1,385,868 | 7/1921 | Geer | 263—41 |
| 1,540,205 | 6/1925 | Cousin | 263—28 |
| 1,829,710 | 10/1931 | Dauch et al. | 263—28 |
| 2,237,503 | 4/1941 | Ridgway | 23—208 |
| 2,397,390 | 3/1946 | Wadsworth | 339—243 |
| 2,406,554 | 4/1946 | Marsh | 263—52 |
| 2,462,247 | 2/1949 | Wright | 339—243 |
| 2,534,518 | 12/1950 | Jeppson | 13—20 |
| 2,618,671 | 11/1952 | Van der Pyle | 13—20 |
| 2,622,863 | 12/1952 | Dauch | 263—28 |
| 2,779,580 | 1/1957 | Steinitz | 263—41 |
| 2,801,156 | 7/1957 | Udy | 23—208 |
| 2,867,431 | 1/1959 | Hess | 263—52 |
| 2,883,268 | 4/1959 | Roche et al. | 23—208 |
| 2,901,325 | 8/1959 | Theuerer | 23—223.5 |
| 2,916,535 | 12/1959 | Marden et al. | 263—46 X |
| 2,957,754 | 10/1960 | Nicholson | 23—204 |
| 2,996,360 | 8/1961 | Kuhlmann | 23—208 |
| 3,013,862 | 12/1961 | May | 23—204 |
| 3,036,892 | 5/1962 | Siebertz | 23—223.5 |
| 3,041,142 | 6/1962 | Van der Beck et al. | 23—204 |

OSCAR R. VERTIZ, *Primary Examiner.*

F. L. MATTESON, JR., MAURICE A. BRINDISI, OSCAR R. VERTIZ, *Examiners.*

EDWARD STERN, J. J. CAMBY,
*Assistant Examiners.*